US010634973B2

(12) United States Patent
Hashemi et al.

(10) Patent No.: US 10,634,973 B2
(45) Date of Patent: Apr. 28, 2020

(54) TWO-DIMENSIONAL OPTICAL PHASED ARRAY

(71) Applicant: University of Southern California, Los Angeles, CA (US)

(72) Inventors: Hossein Hashemi, Pacific Palisades, CA (US); SungWon Chung, Los Angeles, CA (US); Hooman Abediasl, Pasadena, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 15/667,469

(22) Filed: Aug. 2, 2017

(65) Prior Publication Data

US 2018/0039153 A1 Feb. 8, 2018

Related U.S. Application Data

(60) Provisional application No. 62/370,131, filed on Aug. 2, 2016.

(51) Int. Cl.
 *G02F 1/295* (2006.01)
 *G02B 6/122* (2006.01)
 *G02B 5/00* (2006.01)
 *G02F 1/29* (2006.01)

(52) U.S. Cl.
 CPC ........... *G02F 1/2955* (2013.01); *G02B 5/008* (2013.01); *G02B 6/1226* (2013.01); *G02F 1/292* (2013.01); *G02F 2203/50* (2013.01)

(58) Field of Classification Search
 CPC ..... G02B 5/008; G02B 6/1226; G02F 1/2955; G02F 1/292; G02F 2203/50; G02F 2201/06
 See application file for complete search history.

(56) References Cited

U.S. PATENT DOCUMENTS

| 2003/0058504 A1* | 3/2003 | Cho | H04B 10/2543 398/147 |
| 2004/0028099 A1* | 2/2004 | Hongo | G02F 1/0123 372/38.02 |
| 2008/0074722 A1* | 3/2008 | Kang | G02F 1/025 359/240 |

(Continued)

OTHER PUBLICATIONS

Abediasl et al., Monolithic Optical Phased-Array Transceiver in a Standard SO CMOS Process, Optics Express, 2015, vol. 23(5), pp. 6509-6519.

(Continued)

*Primary Examiner* — Ryan A Lepisto
*Assistant Examiner* — Erin D Chiem
(74) *Attorney, Agent, or Firm* — Nixon Peabody LLP

(57) ABSTRACT

An optical device includes an array of unit optical elements. Each of the unit optical elements includes a plurality of amplitude adjustment (AA) elements, each of the plurality of AA elements configured for processing one of different phases of an optical signal; an optical antenna, and a combining mechanism for optically coupling the plurality of AA elements to the optical antenna. The optical device also includes a controller coupled to the plurality of AA elements, the controller configured for generating control signals for the plurality of AA elements according to a target optical beam pattern.

19 Claims, 13 Drawing Sheets

(56) References Cited

U.S. PATENT DOCUMENTS

| | | | | |
|---|---|---|---|---|
| 2008/0094123 | A1* | 4/2008 | Koh | G02F 1/0123 327/513 |
| 2010/0126567 | A1* | 5/2010 | Kaufman | G02B 5/008 136/252 |
| 2011/0158653 | A1* | 6/2011 | Mazed | H04B 10/272 398/140 |
| 2014/0192394 | A1* | 7/2014 | Sun | G02B 6/26 359/289 |
| 2015/0277157 | A1* | 10/2015 | Jones | G02F 1/025 385/3 |
| 2018/0039154 | A1 | 2/2018 | Hashemi et al. | |

OTHER PUBLICATIONS

Adar et al., Phase Coherence of Optical Waveguides, Journal of lightwave technology, 1994, vol. 12(4), pp. 603-606.

Aflatouni et al., Nanophotonic Projection System, Optics Express, 2015, vol. 23(16). pp. 21012-21022.

Apostolidou et al., A 65nm CMOS 30 dBm class-E RF Power Amplifier with 60% PAE and 40% PAE at 16 dB back-Off, IEEE Journal of Solid-State Circuits, 2009, vol. 44(5), pp. 1372-1379.

Chan et al., Optical Beamsteering Using an 8×8 MEMS Phased Array with Closed-Loop Interferometric Phase Control, Optics Express, 2013, vol. 21(3), p. 2807.

Cherchi et al., Dramatic Size Reduction of Waveguide Bends on a Micron-Scale Silicon Photonic Platform, Optics Express, 2013, vol. 21(15), p. 17814.

Chrostowski et al., Impact of Fabrication Non-Uniformity on Chip-Scale Silicon Photonic Integrated Circuits, Proc. Optical Fiber Communication Conference, 2014, pp. 1-3.

Chrostowski et al., Silicon Photonics Design, Cambridge University Press, 2015.

Doylend et al., Two-Dimensional Free-Space Beam Steering with an Optical Phased Array on Silicon-on-Insulator, Optics Express, 2011, vol. 19(22).

Feced et al., Effects of Random Phase and Amplitude Errors in Optical Fiber Bragg Gratings, Journal of Lightwave Technology, 2000, vol. 18(1), pp. 90-101.

Goddy et al., A 2.4-GHz, 27-dBm Asymmetric Multilevel Outphasing Power Amplifier in 65-nm CMOS, IEEE Journal of Solid-State Circuits, 2012, vol. 47(10), pp. 2372-2384.

Guan et al., A Fully Integrated 24 GHz 8-Path Phased-Array Receiver in Silicon, IEEE International Solid-State Circuits Conf. Tech. Dig. Papers, 2004, vol. 39(12), pp. 390-391.

Guo et al., Two-Dimensional Optical Beam Steering with InP-Based Photonic Integrated Circuits, IEEE Journal of Selected Topics in Quantum Electronics, 2013, vol. 19(4).

Harris et al., Efficient, Compact and Low Loss Thermo-Optic Phase Shifter in Silicon, Optics Express, 2014, vol. 22(9), p. 10487.

Henry, C., Theory of the Linewidth of Semiconductor Lasers, IEEE Journal of Quantum Electronics, 1982. vol. 18(2), pp. 259-264.

Hulme et al., Fully Integrated Hybrid Silicon Two Dimensional Beam Scanner, Optics Express, 2015, vol. 23(5), p. 5861.

Hutchison et al., High-Resolution Aliasing-Free Optical Beam Steering, Optica, 2016, vol. 3(8), p. 887.

Kinget et al., A Programmable Analog Cellular Neural Network CMOS Chip for High Speed Image Processing, IEEE Journal of Solid-State Circuits, 1995, vol. 30(3), pp. 235-243.

Krasavin et al., Silicon-Based Plasmonic Waveguides, Opt. Express 18, 2010, pp. 11791-11799.

Krishnamoorthy et al., Exploiting CMOS Manufacturing to Reduce Tuning Requirements for Resonant Optical Devices, IEEE Photonics Journal, 2011, vol. 3(3), pp. 567-579.

Kwong et al., 1×12 Unequally Spaced Waveguide Array for Actively Tuned Optical Phased Array on a Silicon Nanomembrane, Applied Physics Letters, 2011, vol. 99.

Kwong et al., On-chip Silicon Optical Phased Array for Two-Dimensional Beam Steering, Optics Letters, 2014, vol. 39(4), pp. 941-944.

Liu et al., Ultra-Low-Loss CMOS-Compatible Waveguide Crossing Arrays Based on Multimode Bloch Waves and Imaginary Coupling, Optics Letters, 2014, vol. 39(2).

McManamon et al., Optical Phased Array Technology, Proceedings of the IEEE, 1996, vol. 84, No. 2, pp. 268-298.

Michael et al., Statistical Modeling of Device Mismatch for Analog MOS Integrated Circuits, IEEE Journal of Solid-State Circuits, 1992, vol. 27(2), pp. 154-166.

Poulton et al., Frequency-Modulated Continuous-Wave Lidar Module in Silicon Photonics, Proc. Optical Fiber Communication Conference, 2016, pp. 1-3.

Poulton et al., Optical Phased Array with Small Spot Aize, High Steering Range and Grouped Cascaded Phase Shifters, Proc. Advanced Photonics Congress, 2016, pp. 1-3.

Poulton et al., Large-Scale Silicon Nitride Nanophotonic Phased Arrays at Infrared and Visible Wavelengths, Optics Letters, 2017, vol. 42(1), p. 21.

Schwarz, B., Lidar: Mapping the World in 3-D, Nature Photonics, 2010, vol. 4(7), pp. 429-430.

Simard et al., Characterization and Reduction of Spectral Distortions in Silicon-on-Insulator Integrated Bragg Gratings, Optics Express, 2013, vol. 21(20), p. 23145.

Smalley et al., Anisotropic Leaky-Mode Modulator for Holographic Video Displays, Nature, 2013, vol. 498(7454), pp. 313-317.

Sun et al., Large-Scale Nanophotonic Phased Array, Nature, 2013, vol. 493, pp. 195-199.

Sun et al., Single-Chip Microprocessor that Communicates Directly using Light, Nature, 2015, vol. 528, pp. 534-538.

Sun et al., A 45nm CMOS-SOI Monolithic Photonics Platform with Bit-Statistics-Based Resonant Microring Thermal Tuning, IEEE Journal of Solid-State Circuits, 2016, vol. 51(4), pp. 893-907.

Van Acoleyen et al., Off-Chip Beam Steering with a One-Dimensional Optical Phased Array on Silicon-on-Insulator, Optics Letters, 2009, vol. 34(9), p. 1477.

Van Acoleyen et al., Two-Dimensional Optical Phased Array Antenna on Silicon-on-Insulator, Optics Express, 2010, vol. 18(13).

Vasey et al., Spatial Optical Beam Steering with an AlGaAs Integrated Phased Array, Applied Optics, 1993, vol. 32(18), pp. 3220-3232.

Wang et al., Modeling and design of an optimized liquid-crystal optical phased array, Journal of Applied Physics, 2005, vol. 98(7), p. 073101.

Wang et al., Micromirror Based Optical Phased Array for Wide-Angle Beamsteering, IEEE International Conference on Micro Electro Mechanical Systems, 2017, pp. 897-900.

Xiong et al., Integrated GaN Photonic Circuits on Silicon (100) for Second Harmonic Generation, Optics Express, 2011, vol. 19(11), pp. 10 462-10 470.

Yaacobi et al., Integrated Phased Array for Wide-Angle Beam Steering, Optics Letters, 2014, vol. 39(15), pp. 4575.

Yang et al., Phase Coherence Length in Silicon Photonic Platform, Optics Express, 2015, vol. 23(13), p. 16890.

Yaras et al., State of the Art in Holographic Displays: A Survey, Journal of Display Technology, 2010, vol. 6(10), pp. 443-454.

Yariv, A., Coupled-Mode Theory for Guided-Wave Optics, IEEE Journal of Quantum Electronics, 1973, vol. 9(9), pp. 919-933.

Yariv et al., Photonics: Optical Electronics in Modern Communications, Oxford University Press, 2007.

Ye et al., A 2-D resonant MEMS Scanner with an Ultra-Compact Wedge-like Multiplied Angle Amplification for Miniature LIDAR Application, IEEE Sensors, 2016, pp. 1-3.

Zortman et al., Silicon Photonics Manufacturing, Optics express, 2010, vol. 18(23), pp. 23 598-23 607.

360-Degree 3-D LIDAR M8-1 Sensor, Sunnyvale, CA, USA:, 2015.

Velodyne's HDL-64e: A High-Definition LIDAR Sensor for 3-D Applications, Morgan Hill, CA, USA:, 2007.

* cited by examiner

PRIOR ART

TWO-DIMENSIONAL OPTICAL PHASED ARRAY

CROSS-REFERENCE TO RELATED APPLICATIONS

This application claims priority to and the benefit of U.S. Provisional Patent Application No. 62/370,131, filed Aug. 2, 2016 and entitled "LARGE-SCALE OPTICAL PHASED ARRAY", the contents of which paragraphs [0001]-[0012], paragraphs [0043]-[0054], paragraphs [0084]-[0096], and FIGS. 26-37 are herein incorporated by reference in their entirety.

FIELD OF THE INVENTION

This disclosure relates to optical phased arrays and more particularly to two-dimensional optical phased arrays and methods of design and manufacture of the same.

BACKGROUND

Radio frequency (RF) phased arrays have been widely used in military radar and wireless communication systems. Advancements in semiconductor processing technology have enabled monolithic realization of RF phased arrays for commercial applications such as automotive radars and high-speed wireless communications.

Optical phased arrays enable imaging, lidar, display, sensing, and holography. For instance, low-cost large-scale optical phased arrays enable high-resolution imaging and ranging capabilities for automobiles, autonomous vehicles, drones, etc. Optical phased arrays enable 3D cameras. Optical phased arrays can be used for projection and display applications. Dynamic holography is also enabled by two-dimensional optical phased arrays. Optical phased arrays enable high-speed communications including those for chip-to-chip, board-to-board, free-space, and terrestrial applications. Optical phased array can eliminate the stringent mechanical requirement for optical alignment and positioning, and enable reconfigurability in the communication link.

Historically, optical beam steering has been achieved mechanically through, for instance, rotating or tilting mirrors that reflect the light towards different directions. Limitations of mechanical beam-steering include (1) low steering speed, (2) low reliability of moving parts, (3) large form factor, (4) high power consumption, and (5) high cost.

Another traditional beam-steering approach is based on changing the reflection or transmission angles of optical components that are based on liquid crystals or similar material where the refractive index changes with application of electrical stimuli.

Advancements in semiconductor nanofabrication enable realization of complex monolithic optical chips that include a large number of compact optical and even electrical components. For instance, complex optical integrated systems are used in commercial fiber optical communications.

Monolithic optical phased arrays with various complexities using different semiconductor technologies and platforms have been reported. In most past demonstrations, grating couplers are used as optical radiators (aka optical antennas). Beam-steering is done either using variable phase shifters or wavelength scanning.

The major limitations of state-of-the-art optical phased arrays are large area and power consumption of unit optical elements. A unit optical element of a phased array includes an optical variable phase shifter and an optical radiator (antenna). The large footprint of unit elements results in designs with large spacing between elements; this introduces grating lobes and limits the unambiguous field of view. Large power consumption of unit elements prohibits realization of large-scale optical phased arrays at a reasonable power consumption. The fundamental reason for both of the aforementioned limitations is the weak thermo-optical and electro-optical effects in semiconductors. In reported arrays, optical variable phase shifters are based on changing the optical propagation velocity using thermo-optical or electro-optical effects. Weak effects necessitate increasing either the electrical or thermal strengths or device length, leading to increasing power consumption or area, respectively. Optical resonators may be used to increase the sensitivity of optical phase shift with the change of refractive index; however, additional control mechanisms, with associated power consumption and area, are required to ensure that the resonator-based phase shifters operate at the desired wavelength across manufacturing process and temperature variations. Non-semiconductor material may be used to realize variable optical phase shifters with possibly less area and/or power consumption. However, these new materials are largely incompatible with commercial semiconductor processes, and cannot be used towards realization of large-scale optical phased arrays with high manufacturing yield.

Another challenge is the optical loss associated with optical waveguides and components. In large-scale optical phased arrays, the signal would travel several millimeters, through optical components such as optical power dividers, optical phase shifters, optical radiators, etc. each with a non-zero optical loss. Optical amplification may be required to compensate for the aforementioned loss. However, currently, compact power-efficient low-noise optical amplifiers and monolithic optical phased array architectures that benefit from them do not exist.

In summary, large-scale two-dimensional optical phased arrays, with small spacing between optical radiators (ideally half wavelength), compatible with commercial semiconductor processing technologies do not exist.

SUMMARY

In a first embodiment, there is provided an optical device. The optical device includes an array of unit optical elements, where each of the unit optical elements includes a plurality of amplitude adjustment (AA) elements, each of the plurality of AA elements configured for processing one of different phases of an optical signal, an optical antenna, and a combining element or mechanism for optically coupling the plurality of AA elements to the optical antenna. The optical device also includes a controller coupled to the plurality of AA elements, where the controller is configured for generating control signals for the plurality of AA elements according to a target optical beam pattern.

In the optical device of the first embodiment, the plurality of AA elements can be electro-absorption amplitude modulators.

The optical device of the first embodiment can further include a waveguide network having a plurality of waveguide elements, where each of the plurality of waveguide elements is associated one of the different phases, and where each of the unit optical elements further comprises a phase optical coupler for optically coupling each of the plurality of AA elements to one of the plurality of waveguide elements associated with a corresponding one of the different phases. In the optical device, the plurality of waveguide elements can include a plurality of row waveguide elements extending along each row of the array and a plurality of column waveguide elements extending along each column of the array. Further, the plurality of row waveguide elements can be associated with a first and a second of the different phases in an alternating fashion and the plurality of column waveguide elements can be associated with a third and a fourth of the different phases in an alternating fashion.

The optical device of the first embodiment can also include a feed waveguide structure optical coupled to the plurality of waveguide elements. The feed waveguide structure can include at least one feed sub-structure. The feed sub-structure can include an alternating series arrangement of feed phase modulators and waveguide portions and a plurality of feed amplitude adjustment elements coupled to the waveguide portions.

In the optical device of the first embodiment, the different phases can be orthogonal to each other.

In a second embodiment, an optical device is provided. The optical device of the second embodiment includes a waveguide network comprising a plurality of waveguide elements associated with different phases, an array of unit optical elements optically coupled to the plurality of waveguide elements so that each of the unit optical elements is coupled to one of the plurality of waveguide elements associated with each of the different phases, and a controller coupled to each of the unit optical elements, the controller configured for generating control signals for the unit optical elements according to a target direction for the transceiver.

In the optical device of the second embodiment, each of the unit optical elements can include a plurality of amplitude adjustment (AA) elements, each of the plurality of AA elements associated with one of the different phases and coupled to a corresponding one of the plurality of waveguide elements, an optical antenna, and a combining element for optically coupling the plurality of AA elements to the optical antenna. The plurality of AA elements can each be an electro-absorption modulator (EAM).

In the optical device of the second embodiment, the plurality of waveguide elements can include a plurality of row waveguide elements extending along each row of the array and a plurality of column waveguide elements extending along each column of the array. The plurality of row waveguide elements can be associated with a first and a second of the different phases in an alternating fashion and the plurality of column waveguide elements can be associated with a third and a fourth of the different phases in an alternating fashion.

The optical device of the second embodiment can further include a feed waveguide structure optical coupled to the waveguide network. The feed waveguide structure can include at least one feed sub-structure that includes an alternating series arrangement of feed phase modulators and waveguide portions and a plurality of feed amplitude adjustment elements coupled to the waveguide portions.

In the optical device of the second embodiment, the different phases can be orthogonal to each other.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps. The numerical values shown on the Figures are for illustrative purposes and should not be construed to be limiting the scope of the invention in any way.

DETAILED DESCRIPTION

Illustrative embodiments are now described. Other embodiments may be used in addition or instead. Details that may be apparent to a person of ordinary skill in the art may have been omitted. Some embodiments may be practiced with additional components or steps and/or without all of the components or steps that are described.

As noted above, there are several challenges involved in producing and operating compact, yet large-scale, optical phased arrays. Accordingly, the various embodiments are directed to architectures that enable large-scale optical phased arrays. Such array has small spacing between optical antennas and can be monolithically realized in commercial semiconductor processes including commercial silicon-on-insulator processes (e.g., CMOS SOI), indium phosphide (InP) technologies, or hybrid approaches that may be based on heterogeneous integration of multiple semiconductor process technologies.

Therefore, the various embodiments of the invention enable realization of large-scale optical phased arrays where the spacing between adjacent elements may be small. The various embodiments of the invention also enable realization of optical phased arrays that may be integrated monolithically on a semiconductor substrate. Therefore the various embodiments also enable the realization of optical phased arrays that create optical beams with high precision using compact, power-efficient, and economical solution. Thus, the optical phased arrays described herein support a diverse range of applications including automotive sensors, consumer 3D imagers, sensors, and 2D and 3D displays.

Figure 1:
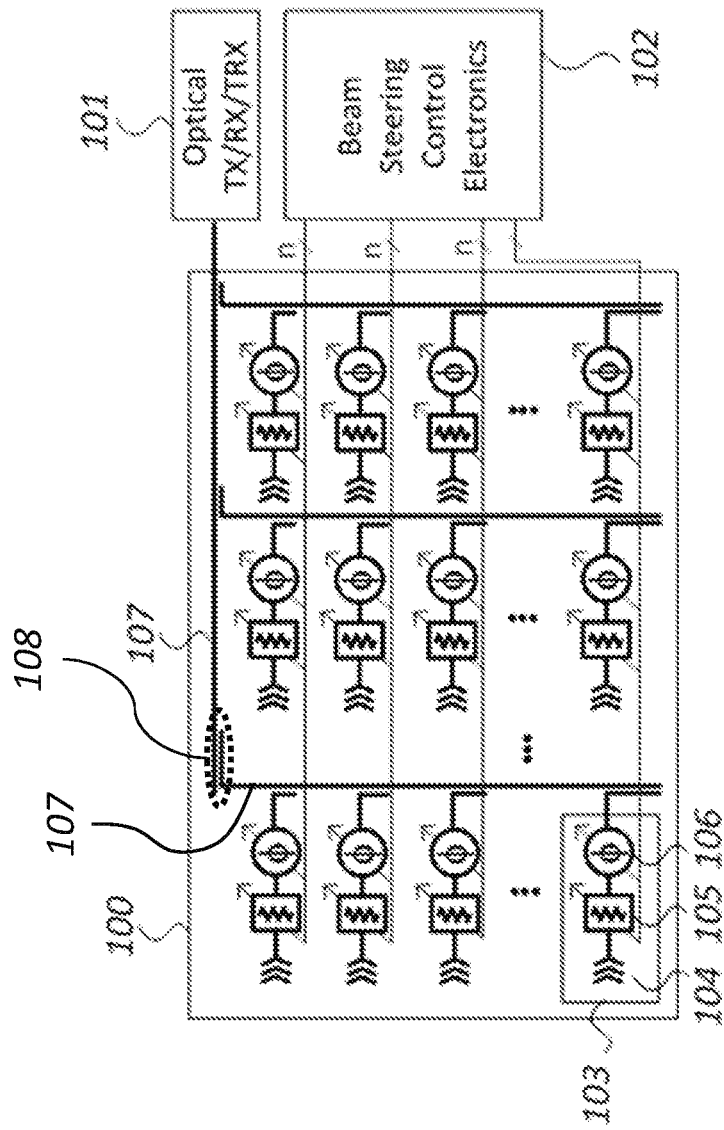
FIG. 1 illustrates a high level overview of a conventional architecture for a two-dimensional optical phased array or optical beamformer that is useful for describing the various embodiments of the present invention.

FIG. 1 illustrates a high level overview of a conventional architecture for a two-dimensional optical phased array or optical beam-former that is useful for describing the various embodiments of the present invention. The scheme may be applied to a transmitter (TX), receiver (RX), or transceiver (TRX) or other optical device 101. The optical core 100 includes an array of unit optical elements 103. Each unit optical element 103 consists of a variable optical phase shifter 106, a variable optical amplitude adjuster 105, and optical radiator or antenna 104. The variable optical amplitude adjusters may provide attenuation or amplification. In some applications, some or all of the variable optical amplitude adjusters 105 may be excluded. The connection of the components of the unit optical elements 103, internally and externally, is through optical waveguides 107 and optical couplers 108 interconnect different ones of waveguides 107. The values for the variable optical phase shifters 106 and variable optical amplitude adjusters 105 are set by a control electronics unit 102.

In operation for transmission, the optical device 101 generates an optical signal which is then distributed to each of the unit optical elements 103. Simultaneously or contemporaneously, the control electronics 102 sends signals to each of the unit optical elements 103. These signals control the operation of the variable optical phase shifter 106 and the variable optical amplitude adjuster 105 in each unit optical element. To generate an optical signal directed in a particular direction, the control electronics 102 selects a combination of phase adjustment and amplitude adjustment for each unit optical element 103. The combination for each unit optical element 103 is selected so that the optical signals generated by the optical antenna 104 at each unit optical element 103 combine constructively and/or destructively, resulting in a single optical beam in the desired direction. In a similar fashion, multiple beams can be transmitted in multiple directions via appropriate selection of amplitude and phase adjustments at each of the unit optical elements 103. In operation for reception, a similar approach is followed, where optical core 100 is "pointed" in a direction of an incoming optical signal via an appropriate selection of amplitude and phase adjustments at each of the unit optical elements 100.

Figure 2:
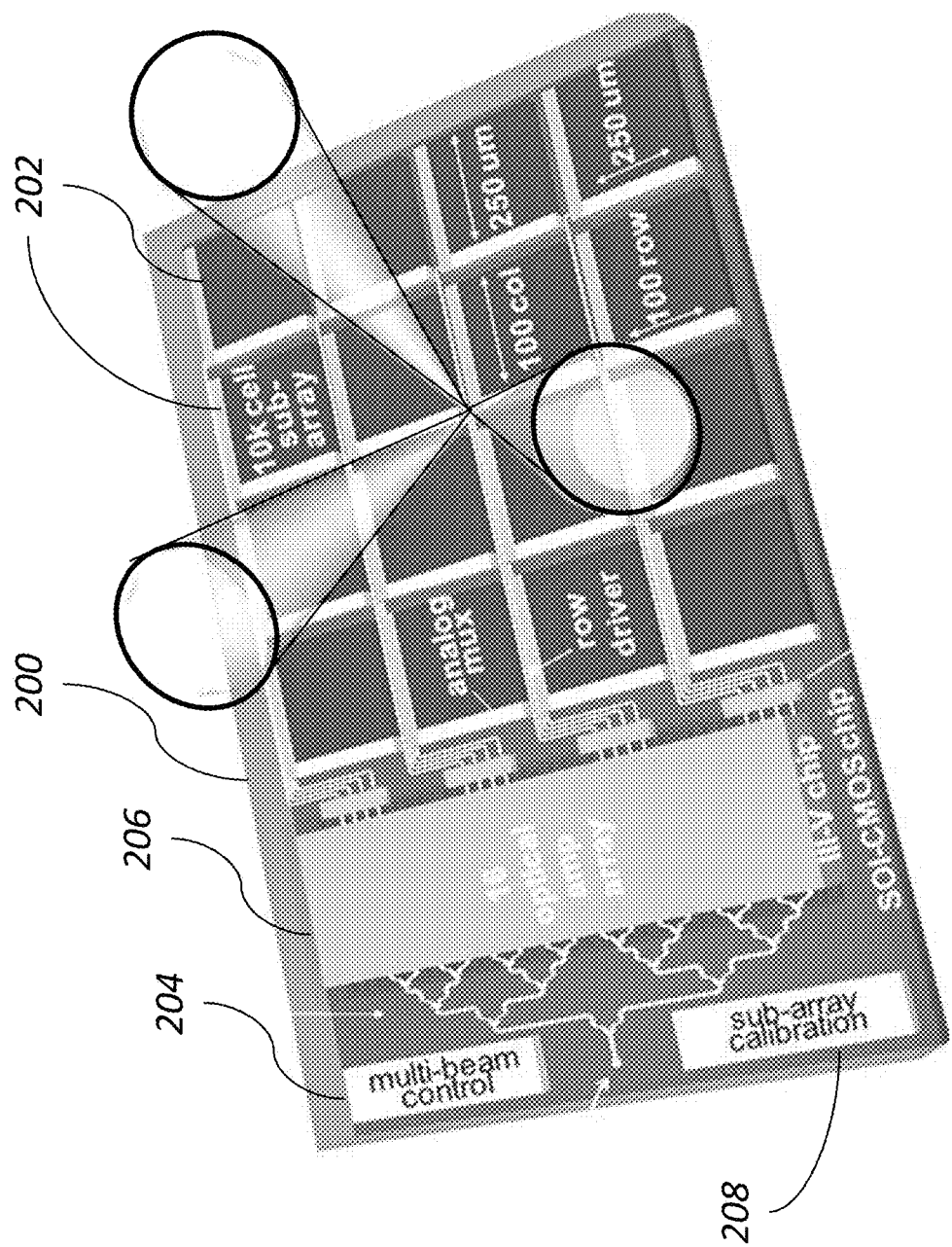
FIG. 2 shows the top-level architecture for a large-scale two-dimensional optical phased array that is useful for describing the various embodiments of the invention.

FIG. 2 shows the top-level architecture for a large-scale two-dimensional optical phased array 200 that is useful for describing the various embodiments of the invention. The phased array is broken into smaller sub-arrays 202. In this example, each of sub-arrays 202 consists of several unit optical elements (such as those illustrated in FIG. 1. In particular, each sub-array can consist of 100×100=10,000=10 K unit optical elements. In other words, in this specific illustration, there are 16×10,000=160,000 unit optical elements in the two-dimensional optical phased array. For illustrative purposes, if the size of each sub-array is around 250 µm×250 µm, this indicates a spacing of 2.5 µm between adjacent optical unit elements. This would be a small-enough value to support beam forming for wavelengths of around 1.5 µm. The settings for the variable phase shifter and variable amplitude adjusters (if present) are controlled via a multi-beam control unit 204. This type of exemplary optical phased array can be realized in a number of semiconductor processing technologies. For example, these types of devices can be implemented using a silicon process, such as on a silicon-on-insulator (SOI) CMOS process. Likewise, a SiGe on SOI or an InP process technology can be have been used. For example, as shown in FIG. 3.

Each sub-array 202 is coupled or connected to an optical amplifier. In FIG. 2, an optical amplifier array 206 is provided and can include 16 optical amplifiers for the the 16 sub-arrays. Optical amplifiers boost the optical signal level into or out of each sub-array, and can compensate for the loss in the optical components and waveguides.

Figure 3:
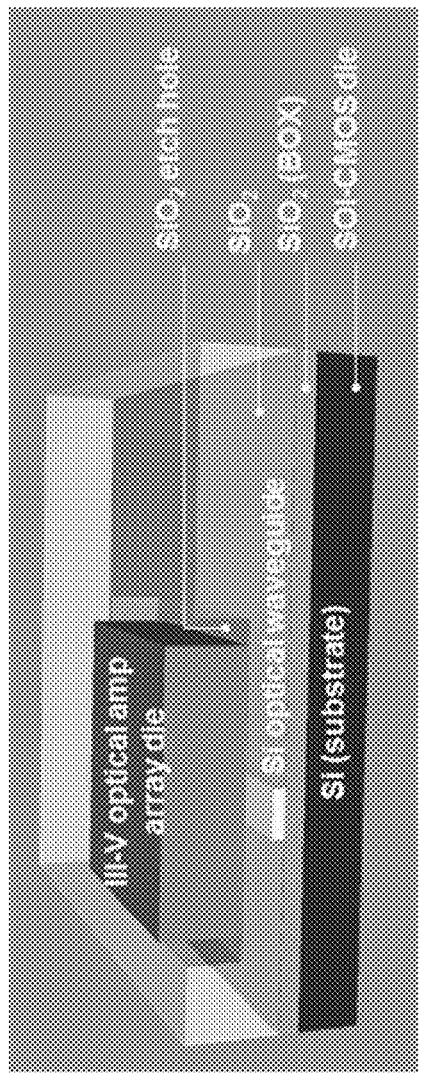
FIG. 3 schematically shows how optical phased array can be implemented using a combination of silicon and non-silicon processes

In the example implementation of FIG. 3, the optical amplifiers are implemented in an InP process technology (marked as III-V chip in the figure). However, any other processes can be used without limitation. Further, the process technology for the optical amplifiers may be the same or different from that of the sub-arrays 202 and other components of such a large-scale optical phased array 202. FIG. 3 shows a schematic that illustrates how optical amplifiers that are realized in a III-V process such as InP can be integrated with a silicon chip that hosts other optical phased array functions such as sub-arrays 202. The optical power may be coupled across the two chips using coupled waveguides. To increase the coupling efficiency, the distance between the waveguides on both chips may be shrunk through selective etching of the additional layers on top of the silicon waveguide. However, this is provided solely for illustrative purposes. The various embodiments can implement similar or different techniques as needed.

In any large-scale optical phased array, the amplitudes and phases of optical signals generated by each optical unit element can differ, even for the same settings. This is due to mismatches that are introduced in the fabrication (aka process mismatches) or due to temperature differences across the array. Therefore, for proper operation of a phased array, it is desirable to determine the amplitudes and phases of optical signals generated by each unit optical element relative to all of the other unit optical elements. As such, calibration may be needed to measure and correct for such amplitude and phase mismatches in a practical configuration. This may be done through calibration circuitry, such as calibration circuitry 208, as shown in FIG. 2. A calibration circuitry may obtain and/or measure the output characteristics of the optical signals being generated by each of optical unit elements, and based on such measurements, communicate any needed corrections to a control unit, such as control unit 102 in FIG. 1 or control unit 204 in FIG. 2, which in turns provides any necessary adjustment at the optical unit elements.

The problem with conventional two-dimensional arrays is it becomes challenging to place an array of optical unit elements in close proximity. Namely, including optical variable phase shifters and optical variable amplitude adjusters for each optical antenna requires a significant amount of space, limiting the minimum space between optical antennas. In view of such challenges, the various embodiments are directed to an improved architecture for optical beam-forming that includes compact realization of optical unit elements. In particular, by implementing the variable optical phase shifters and variable optical amplitude adjusters to support a Cartesian scheme, a compact realization can be provided of the optical unit elements. This is illustrated in FIGS. 4A and 4B.

Figure 4A:
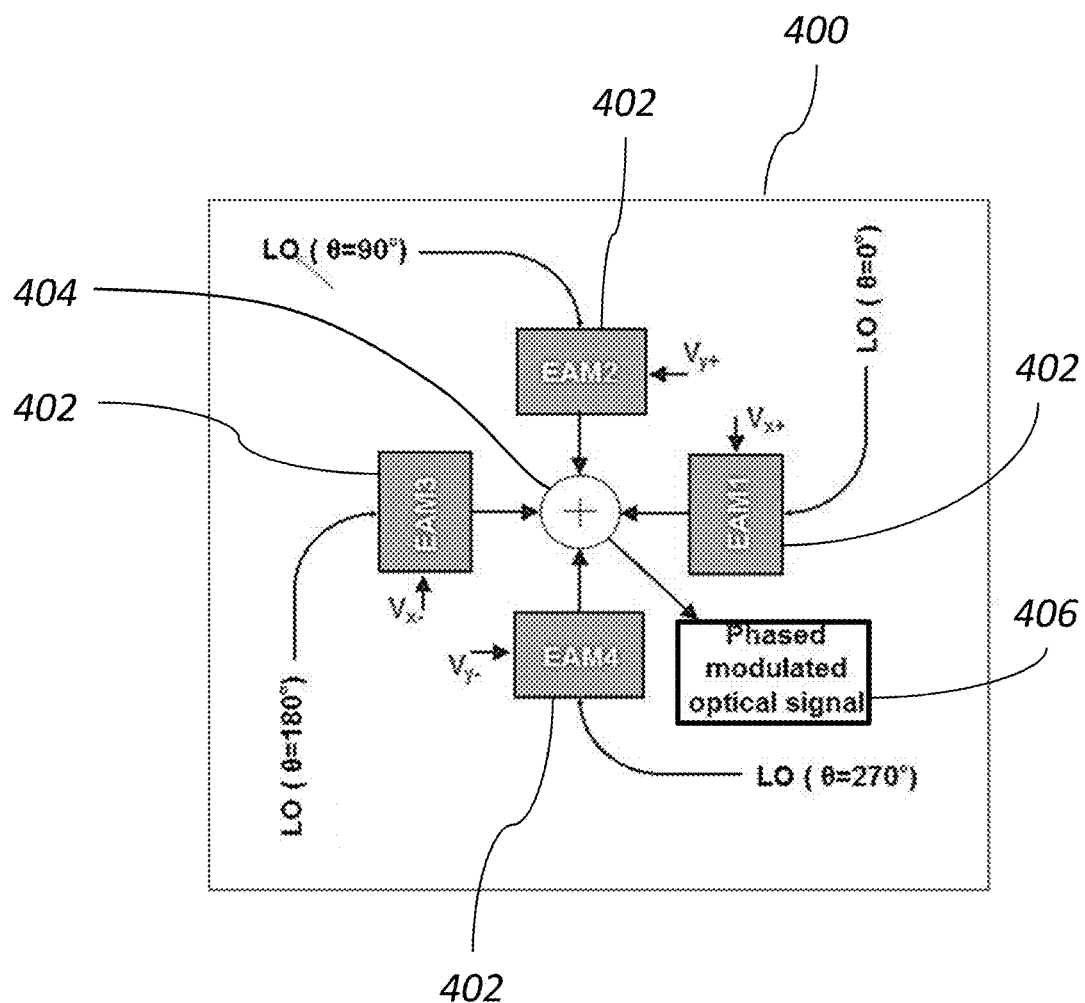
FIG. 4A is a schematic of an exemplary unit optical element according to an embodiment of the present invention.
Figure 4B:
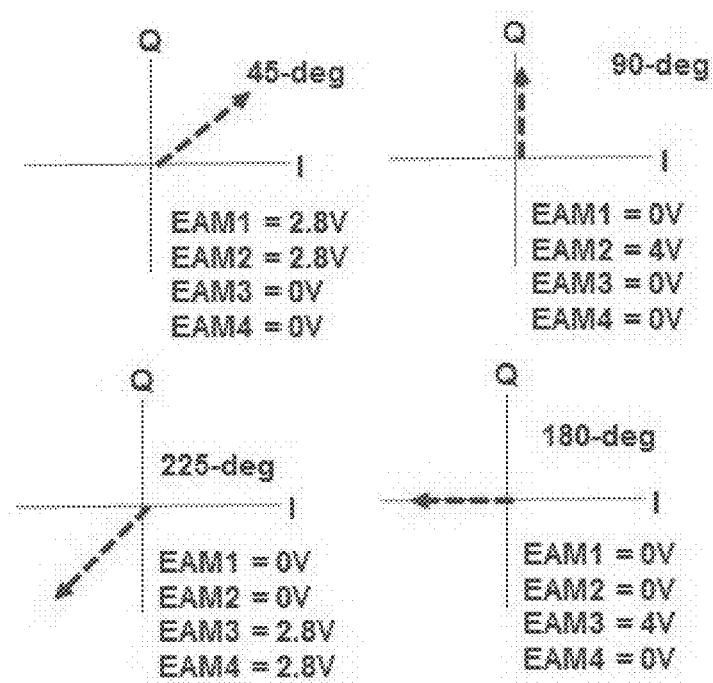
FIG. 4B illustrates generation of complex weights for the unit optical element of FIG. 4A.

FIG. 4A is a schematic of an example unit optical element 400 according to an embodiment of the present invention. As shown in FIG. 4A, the unit optical element includes a plurality of amplitude adjusting elements 402, a combining element 404, and an optical antenna element 406. In the various embodiments, the amplitude adjusting elements 402 can be elements for attenuation of an optical signal, amplification of an optical signal, or both. To facilitate bidirectional operation, that is operation in both a transmit mode and a receive mode, a passive approach may be taken. The function of an optical combining element 404 may be incorporated in the optical antenna element 406. Combining element 404 can be a series of coupled waveguides guides or any other device for combining multiple optical signals. Antenna element 406 can be any type of device for transmitting and/or receiving optical signals.

In operation for transmission, each of the amplitude adjusting elements 402 receives an optical signal with a different phase shift. In certain elements, the four phase-shifted optical signals can be orthogonal optical signals. That is, optical signals with a 90 or 180 degrees phase shift to each other (e.g., 0°, 90°, 180°, 270°, as shown in FIG. 4A). As needed for beamforming, the amplitude of each of these optical signals are adjusted or weighted by a corresponding one of the amplitude adjusting elements 402.

For example, in some embodiments, the amplitude adjusting elements 402 can be electro-absorption modulators (EAM). EAMs enable compact realization of passive amplitude adjusters (weights). In a silicon platform, Germanium may be used to realize EAM. However, while such devices are compact and desirable for reducing overall size of an array, such devices provide small amplitude adjustments.

The amplitude adjusted or weighted optical signals are then combined via combining element 404 and fed to antenna element 406 to provide an optical signal with a complex beamforming weight. The resulting optical signal, i.e., complex weighted signal, from antenna element 406 then interacts with optical signals from other unit optical elements, similarly weighted, to form the final beam.

FIG. 4B illustrates generation of complex weights. In certain embodiments, a Cartesian scheme can be used to define a vector, i.e., the complex weight, for the optical signal generated by the unit optical element 400. As shown in each of the examples in FIG. 4B, the amplitude adjustment of the four phases (0°, 90°, 180°, 270°) results in a vector for each of the four phases. Their combination then produces a final vector, which defines the complex weight for the optical signal. Thus, by control of the weights provided to each of the amplitude adjusting elements 402, an optical signal with a particular complex weight can be produced by each unit optical element 400. Such complex weights can be selected for each unit optical element 400 as needed to provide a necessary beamforming. The phase shift of a Cartesian scheme is given by $\tan^{-1}$ (I/Q) where I and Q are the lengths of in-phase and quadrature-phase vectors. The final vector length is equal to $sqrt(I^2+Q^2)$. Therefore, I (0° & 180°) and Q (90° &270°) can be set appropriately to achieve a desired phase shift and amplitude.

Figure 5:
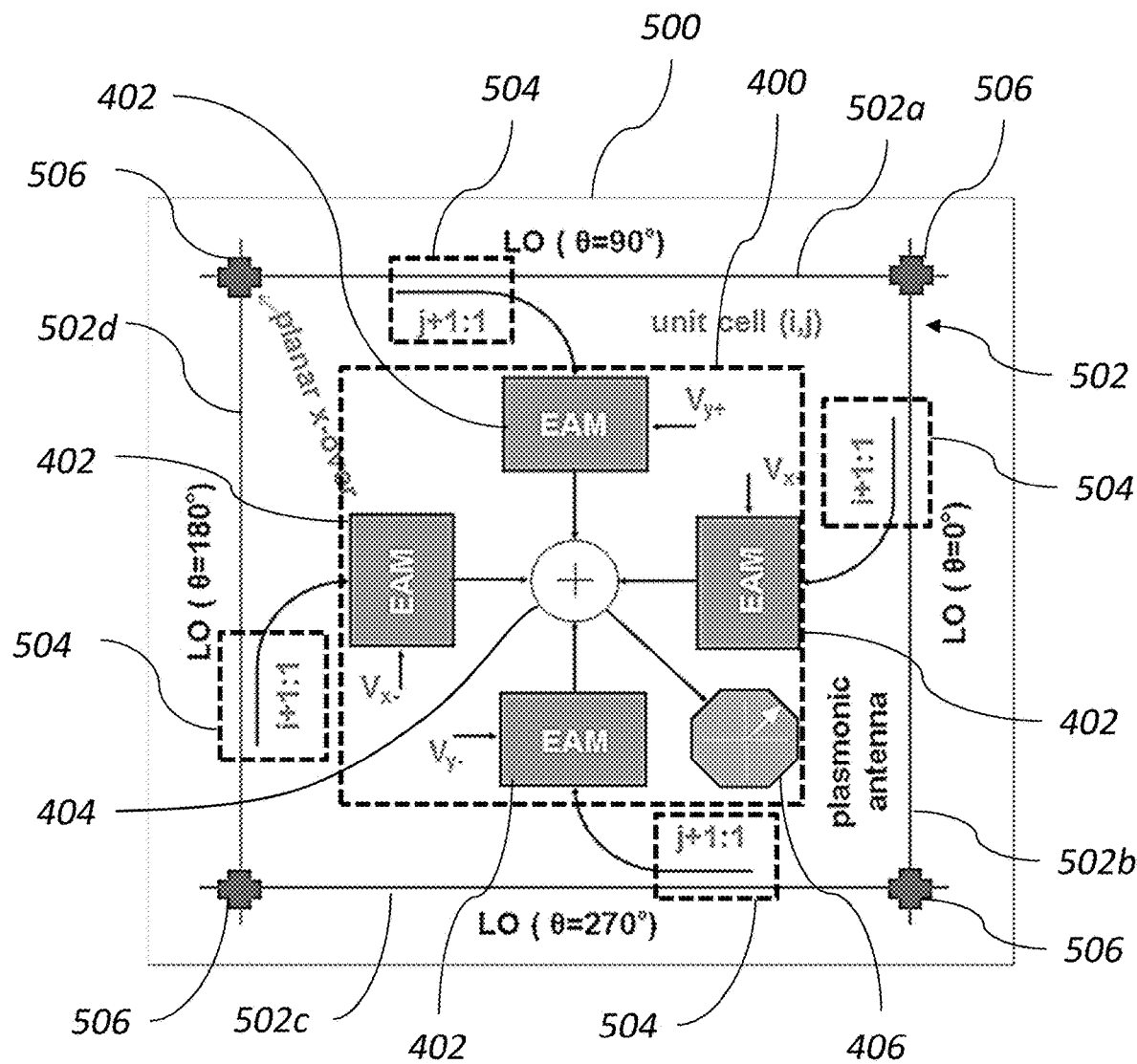
FIG. 5 is an exemplary unit cell for an optical phased array according to an embodiment of the present invention.

FIG. 5 illustrates an exemplary implementation of the unit optical element 400 integrated into a unit cell 500 for an array in accordance with an embodiment of the present invention. As shown in FIG. 5, the four phase-shifted optical signals are applied through a waveguide network, consisting of waveguides 502a-502d carrying optical signals for each of the phases. Optical couplers 504 with appropriate lengths are used to tap-off a desired amount of optical power to each unit optical element 400. The four optical signals, after desired weighting, are combined in an optical antenna as discussed above with respect to FIG. 4A. Resonance or plasmonic effects may be used to reduce the size of optical antenna and other components (e.g., to sub-wavelength). Accordingly in certain embodiments, the optical antenna 406 can be a plasmonic antenna.

As shown in FIG. 5, the waveguides 502a-502d in waveguide network 502 can be implemented in a mesh arrangement, with waveguides 502a and 502c extending in a first direction and waveguides 502b and 502d extending in a second direction perpendicular to the first direction. Planar crossovers 506 can be implemented to along the waveguides 502a-502d to extend further in the first and second directions. The planar crossovers 506 can be configured to avoid any coupling of optical signals between crossing waveguides.

Figure 6:
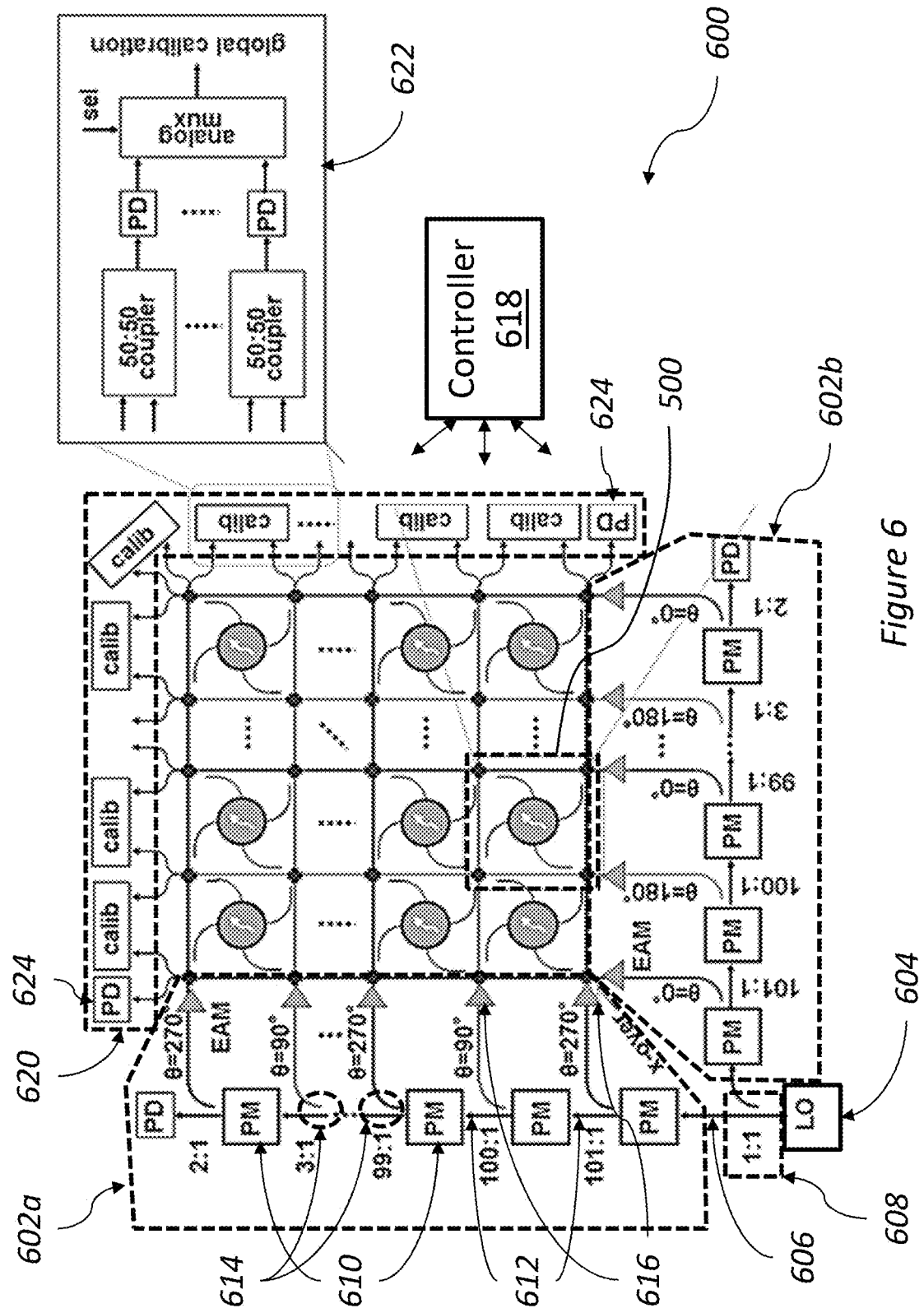
FIG. 6 illustrates an exemplary two-dimensional optic phased array according to an embodiment of the present invention.

FIG. 6 illustrates an exemplary two-dimensional optic phased array 600 according to an embodiment of the present invention. Array 600 includes of several unit optical elements as well as calibration elements as further discussed below.

As shown in FIG. 6, the array 600 consists of a two-dimensional arrangement of unit cells 500. Further, the unit cells 500 are also arranged so as to share waveguides for optical signals of different phases. Thus, across a row of unit cells 500 in array 600, the position of waveguides 502b and 502d would alternate. Similarly, across a row of unit cells 500 in array 600, the position of waveguides 502a and 502c would alternate. In this manner, the resulting arrangement of unit cells 500 in array 600 would define a waveguide network with a series of waveguides (θ=90° and θ=270° lines) between the rows of unit cells 500 that alternate in the phase of the optical signal being carried. Similarly, the arrangement of unit cells 500 in array 600 would define a waveguide network with series of waveguides (θ=0° and θ=180° lines) between the columns of unit cells 500 that alternate in the phase of the optical signal being carried. As such, the number of waveguides needed to support the unit cells 500 is minimized.

The phase shifted optical signals for the waveguide network can be generated in a variety of ways. FIG. 6 illustrates one methodology in accordance with the various embodiments. As shown in FIG. 6, the array 600 includes a waveguide feed structure consisting of a row feed sub-structure 602a and a column feed sub-structure 602b. The two feed sub-structures 602a, 602b are coupled to an optical source and/or receiver (LO) 604. In the example embodiment of FIG. 6, the row feed substructure 602a is directly coupled, via a wave guide 606 or other direct optical connection to LO 604. In contrast, the column feed sub-structure 602b is indirectly coupled to the LO 604 by means of an optical coupler 608 to waveguide 606. As shown in FIG. 6, the optical coupler 608 is a 1:1 coupler to evenly divide an optical signal from LO 604 or to ensure that a full signal is received at LO 604.

In the exemplary embodiment of FIG. 6, the row feed sub-structure 602a consists of a series of phase modulators (PM) 610 and waveguides 612 interconnecting the phase modulators 610. At each phase modulator 610, the optical signal is altered so as to alternative provide 90° and 270° phase shifted optical signals, as shown in FIG. 6. The two phase-shifted signals are then fed into the waveguide network via a coupler 614 and an amplitude adjustment element 616. As discussed above with respect to FIG. 5, this can be any type of amplitude attenuator device, amplitude amplification device, or both. In a particular embodiment, this can be implemented as an EAM. In this manner the waveguides in each row of the waveguide network of the array 600 alternate between the two phase-shifted signals, which amplitudes provide to even out the signal amplitudes from row to row. In certain embodiments, it is recognized that as optical signals are coupled from the series of waveguides 612, the signal at the end of the series of waveguides 212 will be much smaller than at the beginning of the series. Accordingly, in some embodiments, the optical couplers 614 can be configured with a decreasing coupling ratio across the sub-structure 602a. In this manner, the optical signal received at each row can be about the same. At the end of the row feed sub-structure 602a, a photodiode (PD) may be included to enable measuring the optical power of the corresponding waveguide. As to the column feed substructure 602b, this sub-structure is configured substantially identical to the row feed sub-structure 602a. Accordingly, the description above for the row feed sub-structure 602a is sufficient for describing the column feed sub-structure 602b.

In addition to the foregoing, a controller 618 would be used to control the various elements of array 600, including the unit cells 500 and the feed sub-structures 602a and 602b. Such control signals can be routed using and conventional means for routing electronic signals. For example, in a silicon technology, standard metal layers can be utilized. However, the various embodiments are not limited to any particular methodology or technology.

In a practical implementation of the array 600, it is contemplated that calibration circuitry would be needed. Such circuits would be used to detect relative phase mismatch and relative amplitude mismatch that are caused by process variations and the fluctuation of on-chip temperature. Such variations and fluctuations can result in significant changes in performance of the components and thus result in inefficient or ineffective beamforming. In array 600, such calibration is provided by means of calibration system 620. The calibration system 620 provides offset information in two ways. First, the calibration system includes a series of optical monitors 622. These monitors 622 are each designed to collect an optical signal from two adjacent rows, two adjacent columns, or a final row and a final column. In operation, the comparators 622 are configured to determine the difference in phase shifts and amplitudes between the two optical signals. An example implementation of such a comparator is shown in FIG. 6 at 622. In operation, the two optical signals are coupled and fed to a photodiode (PD) in 622. The resulting signal from the photodiode is then characteristic of the amplitude and phase differences. For instance, the beat signal of two optical signals with the same frequency and amplitude provides a DC signal whose amplitude depends on the relative phase shift between the two optical signals. As shown in FIG. 6, this process can be performed in a multiplexed manner so as to reduce the number of components needed for calibration purposes. However, the various embodiments are not limited to any particular configuration for comparator 622. The calibration system also includes single photodetectors (PDs) 624 at the end of rows and columns. These are used to detect the absolute optical power. The signals generated by components 622 and 624 can be fed back to controller 618. Based on these signals, the controller 618 can adjust the operation of the unit cells 500 or any of the components in the feed sub-structures 602a and 602b. It may be necessary or desirable to measure the relative phases among the array elements. In such a scenario, similar calibration units may be incorporated between adjacent unit optical elements. Various schemes may be used for such calibration. For instance, the relative phase differences may be measured among pairs of optical unit elements while all other optical elements are turned off (e.g., maximum attenuation setting).

Figure 7:
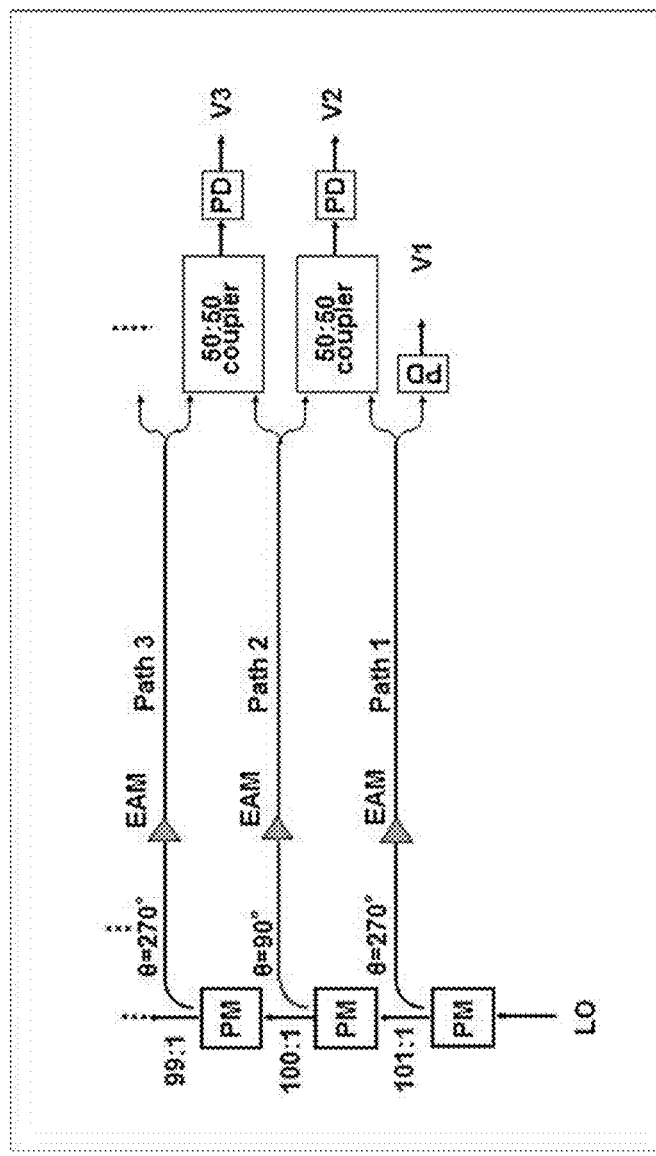
FIG. 7 schematically illustrates the monitors in FIG. 6.

FIG. 7 schematically illustrates how the monitors in FIG. 6 are intended to work. In particular, as discussed above, the monitors are intended to capture differences between paths formed by the waveguides in the waveguide network. Amplitude mismatches between rows and columns can be compensated by using amplitude adjusters such as electro-absorption modulators. Likewise, phase mismatches between rows and columns may be compensated by using phase adjusters (or phase modulators).

Figure 8:
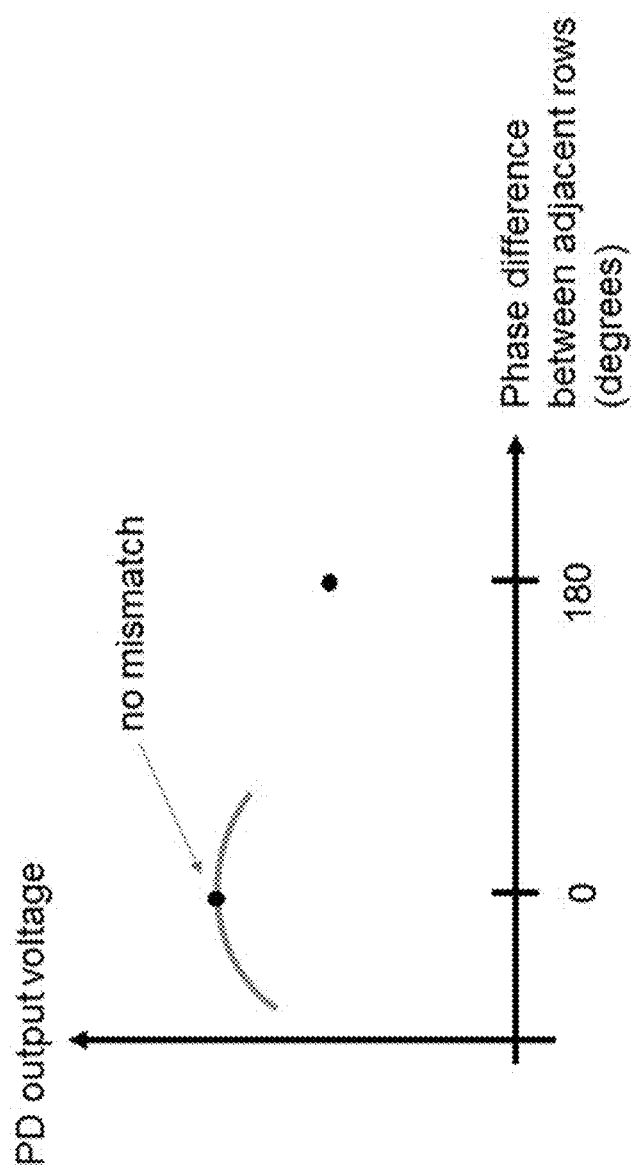
FIG. 8 shows a photodetector (PD) output voltage versus phase difference between two adjacent rows that is useful for performing a phase calibration in accordance with embodiments of the present invention.

FIG. 8 shows a photodetector (PD) output voltage versus phase difference between two adjacent rows that are shown in FIG. 7 that is useful for performing a phase calibration in accordance with embodiments of the present invention. In an exemplary process, the phase calibration is performed by finding a phase difference among a pair of two adjacent phase modulators. That phase difference is one that maximizes the photodetector output voltage by tuning one phase modulator while fixing the other phase modulator among the two adjacent phase modulators. The phase calibration among two adjacent columns is performed in the same way as the row calibration.

Figure 9:
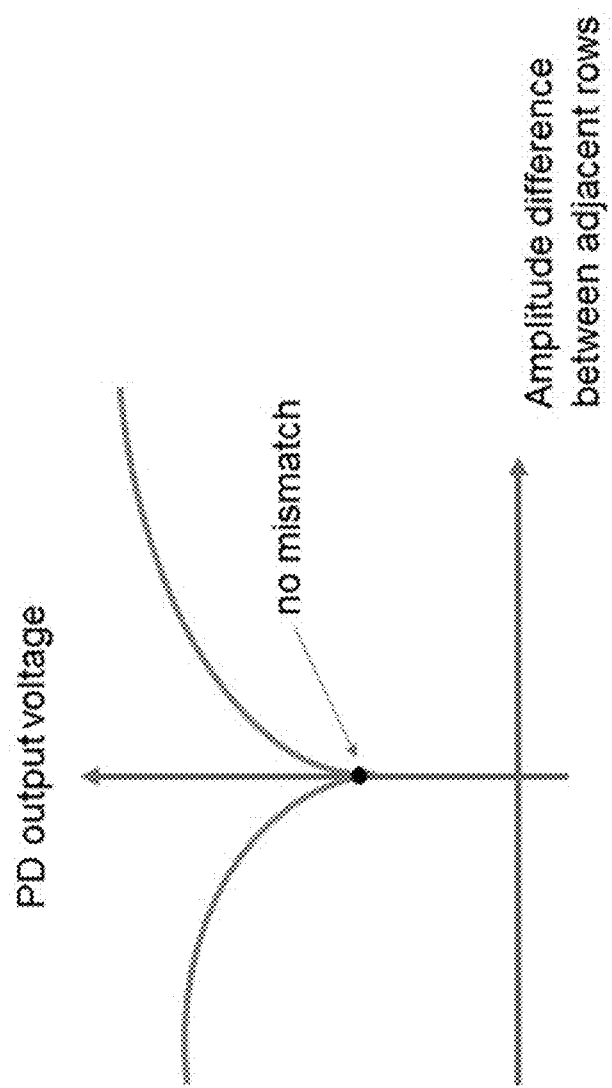
FIG. 9 shows a PD output voltage versus amplitude difference between adjacent two rows that is useful for performing an amplitude calibration in accordance with embodiments of the present invention.

FIG. 9 shows a PD output voltage versus amplitude difference between adjacent two rows that are shown in FIG. 7 that is useful for performing an amplitude calibration in accordance with embodiments of the present invention. In an exemplary process, while maintaining the two adjacent phase modulators to have 180 degree phase shift, the relative amplitude mismatch calibration is performed by finding the minimum photodetector output voltage. This search is executed by tuning an EAM among two adjacent rows while the other EAM among the two rows is fixed. Although relative amplitude calibration by finding the maximum value of the PD output voltage is also possible, because the PD output voltage changes much more abruptly near the minimum value, amplitude calibration by finding the minimum PD output voltage achieves more accurate calibration. The relative amplitude calibration between two adjacent columns is performed in the same way as the row calibration. Because the accuracy of phase calibration depends on the quality of amplitude calibration, after the amplitude calibration is completed, the phase calibration and the amplitude calibration both are repeated until additional iterations do not much change the previous calibration point. This calibration process is necessary when the ambient temperature changes or after the system power on. To reduce the frequency calibration for temperature variation, calibration status per each temperature step can be stored into a non-volatile memory and reused for a longer period until the device aging effects become noticeable. For this purpose, the array system requires temperature sensors with a small footprint distributed over the system.

Figure 10:
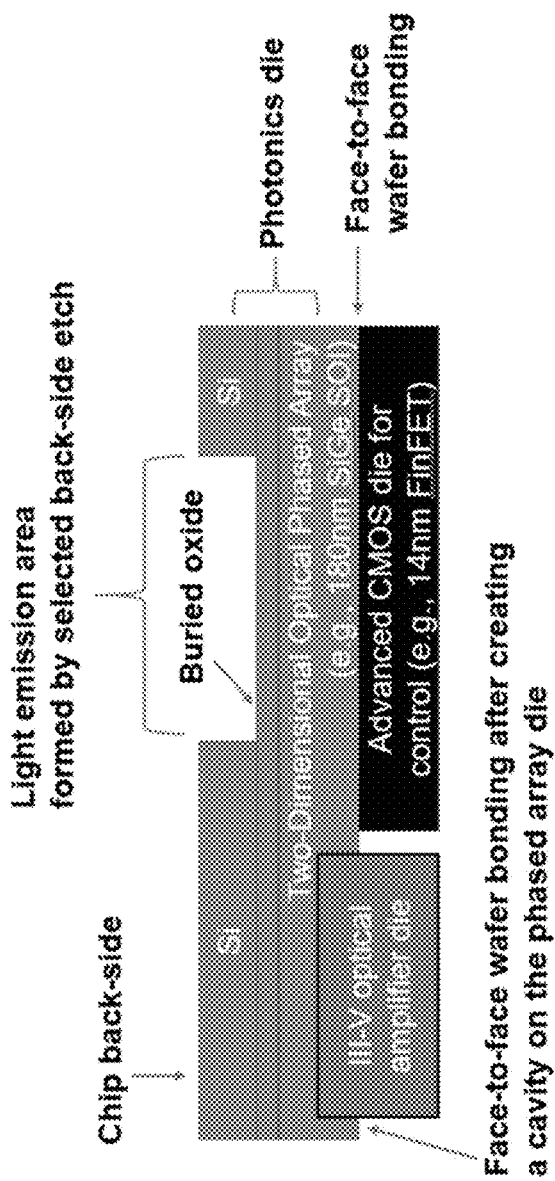
FIG. 10 illustrates an embodiment of a hybrid integration approach for the optical phased array.

FIG. 10 illustrates an embodiment of a hybrid integration approach for the optical phased array. Although electro-optic modulators and optical waveguides can be integrated in a single wafer, advanced digital signal processing can take advantage in cost and size by using an advanced silicon technology. Assuming the core of optical phased array (e.g., waveguides, antennas, variable phase and amplitude adjusters) are realized in a silicon process and optical amplifiers are implemented in a III-V process, a three-chip bonding scheme is illustrated in FIG. 10. The main photonics die is face-to-face bonded to the advanced CMOS die because very dense die-to-die connection with 1-2 micron pitch can be implemented. In order to allow the light emission from the photonics die, the back-side of the photonics die is selectively etched down to the transparent buried oxide layer.

Figure 11:
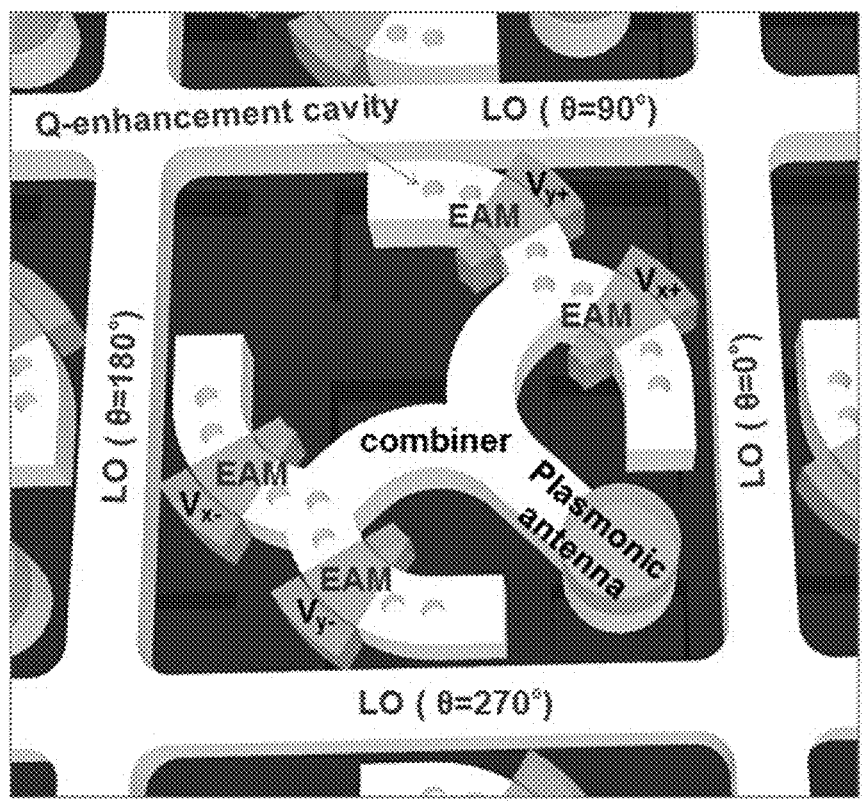
FIG. 11 is a three-dimensional rendering of a portion of an optical phased array in accordance with the various embodiments.

FIG. 11 is a three-dimensional rendering of a portion of an optical phased array in accordance with the various embodiments. In particular, FIG. 7 shows an exemplary configuration for a compact unit optical element consisting of couplers, electro-absorption modulators with Q-enhanced optical cavities to enhance the optical field and modulation effect, a combiner, and an optical antenna.

Figure 12:
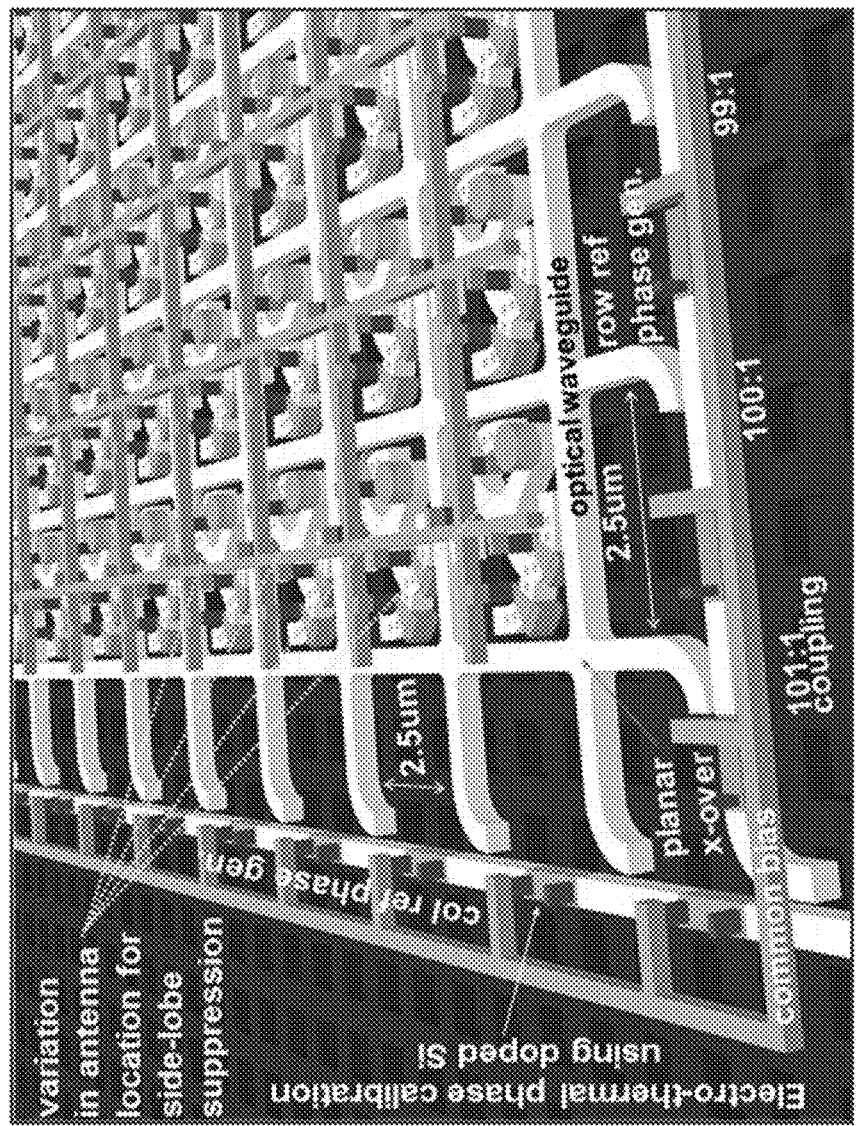
FIG. 12 is another three-dimensional rendering of a portion of an optical phased array in accordance with the various embodiments.

FIG. 12 is another three-dimensional rendering of a portion of an optical phased array in accordance with the various embodiments. In particular, FIG. 12 illustrates an embodiment of the subarray with non-uniform placement of unit optical elements to reduce the unwanted side-lobe levels in the array radiation pattern. The non-uniform spacings may be random. Computer simulations may be used to derive the spacings between unit optical elements (in particular optical antennas) for a desired set of optical beam patterns.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for hybrid coupler based radio frequency (RF) multiplexers.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

REFERENCES

The following references are discussed and referred herein for purposes of understanding the various embodiments. The contents of these references are hereby incorporated by reference in their entirety.

[1] K. Van Acoleyen, H. Rogier, and R. Baets, "Two-dimensional optical phased array antenna on silicon-on-insulator," *Optics Express*, vol. 18, no. 13, June 2010.

[2] J. Doylend, M. Heck, J. Bovington, J. Peters, L. Coldren, and J. Bowers, "Two-dimensional free-space beam steering with an optical phased array on silicon-on-insulator," *Optics Express*, vol. 19, no. 22, October 2011.

[3] D. Kwong, A. Hosseini, Y. Zhang, and R. Chen, "1×12 Unequally spaced waveguide array for actively tuned optical phased array on a silicon nanomembrane," *Applied Physics Letters*, 99, 2011.

[4] J Sun, E. Timurdogan, A. Yaacobi, E. Shah Hosseini, and M. Watts, "Large-scale nanophotonic phased array," *Nature*, vol. 493, pp. 195-199, January 2013.

[5] W. Guo, P. Binetti, C. Althouse, M. Masanovic, H. Ambrosius, L. Johansson, and L. Coldren, "Two-dimensional optical beam steering with InP-based photonic integrated circuits," *IEEE Journal of Selected Topics in Quantum Electronics*, vol. 19, no. 4, July/August 2013.

[6] Y. Liu, J. Shainline, X. Zeng, and M. Popović, "Ultra-low-loss CMOS-compatible waveguide crossing arrays based on multimode Bloch waves and imaginary coupling," *Optics Letters*, vol. 39, no. 2, January 2014.

[7] D. Kwong, A. Hosseini, J. Covey, Y. Zhang, X. Xu, H. Subbaraman, and R. Chen, "On-chip silicon optical phased array for two-dimensional beam steering," *Optics Letters*, vol. 39, no. 4, February 2014.

[8] A Yaacobi, J. Sun, M. Moresco, G. Leake, D. Coolbaugh, and M. Watts, "Integrated phased array for wide-angle beam steering," *Optics Letters*, vol. 39, no. 15, August 2014.

[9] H. Abediasl and H. Hashemi, "Monolithic optical phased-array transceiver in a standard SO CMOS process," *Optics Express*, vol. 23, no. 5, pp. 6509-6519, May 2015.

[10] J. Hulme, J. Doylend, M. Heck, J. Peters, M. Davenport, J. Bovington, L. Coldren, and J. Bowers, "Fully integrated hybrid silicon two dimensional beam scanner," *Optics Express*, vol. 23, no. 5, March 2015.

[11] F. Aflatouni, B. Abiri, A. Rekhi, and A. Hajimiri, "Nanophotonic projection system," *Optics Express*, vol. 23, no. 16, August 2015.

[12] C. Sun, M. T. Wade, Y. Lee, J. S. Orcutt, L. Alloatt, M. S. Georgas, A. S. Waterman, J. M. Shainline, R. R. Avizienis, S. Lin, B. R. Moss, R. Kumar, F. Pavanello, A. H. Atabaki, H. M. Cook, A. J. Ou, J. C. Leu, Y.-H. Chen, K. Asanovic, R. J. Ram, Milos A. Popovic, and V. M. Stojanovic, "Single-chip microprocessor that communicates directly using light," *Nature*, vol. 528, pp. 534-538, December 2015.

What is claimed is:

1. An optical device, comprising:
an array of unit optical elements, each of the unit optical elements comprising:
a plurality of amplitude adjustment (AA) elements, each of the plurality of AA elements being configured to modulate an amplitude of a respective preliminary optical signal having a distinct phase, the phase of each respective preliminary optical signal being different than the phases of the other respective preliminary optical signals;
a combining mechanism configured to combine the respective amplitude-modulated preliminary optical signals having distinct phases from each of the plurality of AA elements into a single combined optical signal having a desired phase; and an optical antenna coupled to the combining mechanism and configured to transmit the single combined optical signal having the desired phase received from the combining mechanism; and a controller coupled to the plurality of AA elements, the controller configured to generate control signals that determine an amount of amplitude modulation achieved by each of the plurality of AA elements of each unit optical element according to a target optical beam pattern.

2. The optical device of claim 1, wherein the plurality of AA elements each comprise an electro-absorption modulator (EAM).

3. The optical device of claim 1, further comprising a waveguide network comprising a plurality of waveguide elements, wherein each of the plurality of waveguide elements is associated with a respective one of the preliminary optical signals having distinct phases, and wherein each of the unit optical elements further comprises a phase optical coupler for optically coupling each of the plurality of AA elements to one of the plurality of waveguide elements such that each of the plurality of AA elements that is configured to modulate the amplitude of the respective preliminary optical signal with the distinct phase is coupled to the waveguide element associated with the same distinct phase.

4. The optical device of claim 3, wherein the waveguide network is optically coupled to at least one of a light source or a photodetector.

5. The optical device of claim 3, wherein the plurality of waveguide elements comprise a plurality of row waveguide elements extending along each row of the array and a plurality of column waveguide elements extending along each column of the array.

6. The optical device of claim 5, wherein the plurality of row waveguide elements is associated with a first phase and a second phase in an alternating fashion, and wherein the plurality of column waveguide elements is associated with a third phase and a fourth phase in an alternating fashion.

7. The optical device of claim 3, further comprising a feed waveguide structure optical coupled to the plurality of waveguide elements.

8. The optical device of claim 7, wherein the feed waveguide structure comprises at least one feed sub-structure, the feed sub-structure comprising:

an alternating series arrangement of feed phase modulators, each adjacent pair of feed phase modulators being optically coupled via a waveguide portion, each of the feed phase modulators being associated with a respective one of the distinct phases in an alternating fashion, and a plurality of feed amplitude adjustment elements coupled to the waveguide portions.

9. The optical device of claim 1, wherein the preliminary optical signals whose amplitude is modulated by the plurality of AA elements have phase offsets of 0 degrees, 90 degrees, 180 degrees, or 270 degrees.

10. The optical device of claim 1, further comprising an integrated circuit device having the array and the controller formed therein.

11. An optical device, comprising:

a waveguide network comprising a plurality of waveguide elements associated with preliminary optical signals having a plurality of distinct phases, the plurality of waveguide elements including at least a first group of waveguide elements associated with preliminary optical signals having a first phase and a second group of waveguide elements associated with a preliminary optical signals having a second phase;

an array of unit optical elements optically coupled to the plurality of waveguide elements such that each of the unit optical elements is coupled to one waveguide element of the first group of waveguide elements and one waveguide element of the second group of waveguide elements; and a controller coupled to each of the unit optical elements, the controller configured to generate control signals for the unit optical elements according to a target direction for the transceiver.

12. The optical device of claim 11, wherein each of the unit optical elements comprises:

a plurality of amplitude adjustment (AA) elements, each of the plurality of AA elements being associated with a respective one of the plurality of distinct phases and coupled to a corresponding one of the plurality of waveguide elements, each of the plurality of AA elements being configured to modulate an amplitude of a respective preliminary optical signal having the respective one of the plurality of distinct phases, a combining element configured to combine the amplitude-modulated preliminary optical signals having the distinct phases from each of the plurality of AA elements into a single combined optical signal having a desired phase; and an optical antenna coupled to the combining mechanism and configured transmit the single combined optical signal having the desired phase received from the combining mechanism.

13. The transceiver of claim 12, wherein the plurality of AA elements each comprise an electro-absorption modulator (EAM).

14. The optical device of claim 11, wherein the plurality of waveguide elements comprise a plurality of row waveguide elements extending along each row of the array and a plurality of column waveguide elements extending along each column of the array.

15. The optical device of claim 14, wherein the plurality of row waveguide elements is associated with the first phase and a third phase in an alternating fashion, and wherein the plurality of column waveguide elements is associated with the second phase and a fourth phase in an alternating fashion.

16. The optical device of claim 11, further comprising a feed waveguide structure optical coupled to the waveguide network.

17. The optical device of claim 16, wherein the feed waveguide structure comprises at least one feed sub-structure, the feed sub-structure comprising:

an alternating series arrangement of feed phase modulators, each adjacent pair of feed phase modulators being optically coupled via a waveguide portion, each of the feed phase modulators being associated with a respective one of the distinct phases in an alternating fashion; and a plurality of feed amplitude adjustment elements coupled to the waveguide portions.

18. The optical device of claim 11, wherein the plurality of waveguide elements are associated with preliminary optical signals having relative phase offsets of 0 degrees, 90 degrees, 180 degrees, or 270 degrees.

19. The optical device of claim 11, further comprising an integrated circuit device having the array and the controller formed therein.

* * * * *